US008953877B2

(12) United States Patent
Babacan (10) Patent No.: US 8,953,877 B2
(45) Date of Patent: Feb. 10, 2015

(54) NOISE ESTIMATION FOR IMAGES (71) Applicant: Google Inc., Mountain View, CA (US)

(72) Inventor: Sevket Derin Babacan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 13/894,364

(22) Filed: May 14, 2013

(65) Prior Publication Data

US 2014/0341466 A1 Nov. 20, 2014

(51) Int. Cl.
G06F 9/48 (2006.01)
G06K 9/40 (2006.01)
H04N 5/217 (2011.01)
H04N 7/12 (2006.01)

(52) U.S. Cl.
CPC ........................................ G06K 9/40 (2013.01)
USPC ........... 382/163; 382/199; 382/268; 348/241; 375/240.24

(58) Field of Classification Search
CPC .................. G06T 5/002; G06T 7/0085; G06T 2207/10016; G06T 5/20; G06T 2207/20008; G06T 2207/20032; G06T 7/2053; G06T 5/40; H04N 5/21; H04N 17/00; H04N 5/142
USPC ......... 382/163, 275, 164, 274, 190, 260, 167, 382/268, 155, 199, 195, 270, 162, 165, 254, 382/236, 252, 276; 348/241, 708, 625, 348/207.99, 531, 533, 607, 452, 699; 375/240.16, 240.29, 240.24; 358/426.01, 1.9, 521, 3.27
See application file for complete search history.

(56) References Cited

U.S. PATENT DOCUMENTS

| 5,825,846 | A | * | 10/1998 | Aach et al. ....................... 378/98 |
| 5,923,775 | A | | 7/1999 | Snyder et al. |
| 6,636,645 | B1 | * | 10/2003 | Yu et al. ......................... 382/268 |
| 6,970,605 | B1 | | 11/2005 | Kondo et al. |
| 7,983,501 | B2 | | 7/2011 | Chiu |
| 8,599,288 | B2 | * | 12/2013 | Oishi ............................. 348/241 |
| 8,665,376 | B2 | * | 3/2014 | Mathew et al. ............... 348/607 |
| 8,768,093 | B2 | * | 7/2014 | Yoo et al. ....................... 382/275 |
| 2006/0039590 | A1 | | 2/2006 | Lachine |
| 2007/0109430 | A1 | | 5/2007 | Maurer |
| 2008/0239153 | A1 | | 10/2008 | Chiu |

OTHER PUBLICATIONS

Mitchell II, "Software Review", Nik Dfine 2.0, pp. i-v, pp. 1-28, 2008.
Bosco A et al.; "Adaptive Temporal Filtering for CFA Video Sequences"; Proceedings of ACIVS: Advnaced Concepts for Intelligent Visionsystems, Sep. 9, 2002; 6 Pages.
European Patent Office: International Search Report for PCT/US2014/037855; Aug. 29; 5 Pages.

* cited by examiner

Primary Examiner — Sheela Chawan
(74) Attorney, Agent, or Firm — IP Spring (57) ABSTRACT Implementations relate to estimating noise in images. In some implementations, a method includes extracting a plurality of sample blocks of pixels from a received image, where each sample block includes a subset of pixels of the image. One or more of the sample blocks are examined for texture content based on whether the sample blocks include one or more edges based on a predetermined threshold. At least one sample block determined to include texture content is removed. The method determines one or more average color variances based on the remaining sample blocks that have not been removed, where noise estimations for the image are based on the average color variances.

19 Claims, 8 Drawing Sheets

NOISE ESTIMATION FOR IMAGES

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. However, many images, such as photographs taken by a camera, include various forms of image noise. Such noise includes undesired variation in color or brightness of the pixels of an image, and can be produced from a variety of sources including lighting conditions under which an image was captured, performance of camera components, image compression techniques, and other sources.

SUMMARY

Implementations of the present application relate to estimating noise in images. In some implementations, a method includes extracting a plurality of sample blocks of pixels from a received image, where each sample block includes a subset of pixels of the image. One or more of the sample blocks are examined for texture content based on whether the sample blocks include one or more edges based on a predetermined threshold. At least one sample block determined to include texture content is removed. The method determines one or more average color variances based on the remaining sample blocks that have not been removed, where noise estimations for the image are based on the average color variances.

Various implementations and examples of the method are described. For example, the sample blocks can have different sizes and different numbers of pixels. The method can cluster the sample blocks into associated color bins based on a mean color of each sample block, where each color bin represents a different sub-range of colors out of a total range of colors for the pixels of the image. The method can determine an average color variance associated with each color bin based on the remaining sample blocks in each color bin and a noise estimation for each color bin is based on the associated average color variances. The clustering can include adding each of the sample blocks into an associated color bin in response to the sample block having a lower variance than the highest variance block in the associated bin. Each color bin can provide a data structure, such as a heap, for storing a sorted order of the sample blocks in the bin based on a variance of the sample blocks in the color bin. For example, clustering the sample blocks into bins can include, for each sample block, adding the block to the data structure of the associated color bin in a sorted position within the data structure in response to a variance of the sample block being lower than the highest variance sample block in the data structure, and discarding the sample block in response to the block having a higher variance than the highest variance sample block.

Some implementations can include removing one or more of the sample blocks having a color variance over a predetermined variance threshold. The predetermined variance threshold can be based on the minimum variance found by examining the sample blocks. The method can remove one or more sample blocks which are spatially overlapping at least one other sample block by at least a threshold amount within the image.

Examining the sample blocks for texture content can include determining whether a magnitude of one dominant direction of one or more edges in each sample block is larger than a magnitude of another dominant direction of one or more edges in that sample block relative to the predetermined threshold. For example, the method can determine one or more image gradients in each of the examined sample blocks and form a matrix from the image gradients, where eigenvalues of the matrix can be used to determine whether the predetermined threshold has been exceeded, thereby indicating a presence of texture content. For example, a ratio of the eigenvalues can be compared to a predetermined value and to the predetermined threshold around the predetermined value to determine whether texture content is present in the examined sample block.

A method can include, in some implementations, receiving an image including a plurality of pixels and extracting sample blocks of pixels from the image, where each sample block includes a subset of pixels of the image. The method clusters the sample blocks into appropriate color bins based on a mean color of each sample block, where each color bin represents a different sub-range of colors out of a total range of possible colors for the pixels of the image. At least one of the sample blocks is removed in response to determining that the sample block includes texture content having one or more edges. The method determines an average color variance associated with each color bin based on the remaining sample blocks in each color bin that have not been removed, where a noise rating for each bin is based on the associated average color variance.

Various implementations and examples of the above method are described. Each sample block can be added to a data structure of an associated color bin in a sorted position within the data structure in response to a variance of the sample block being lower than the highest variance sample block already in the data structure. Removing at least one of the sample blocks can includes examining the sample blocks for texture content by determining one or more image gradients in each of the examined sample blocks, and forming a matrix from the image gradients for each sample block. Each matrix is used to determine whether one or more edges are present in each examined sample block based on a predetermined threshold.

In some implementations, a system can include a storage device and at least one processor accessing the storage device and operative to perform operations. The operations include extracting a plurality of sample blocks of pixels from a received image, where each sample block includes a subset of pixels of the image. One or more of the sample blocks are examined for texture content based on whether the sample blocks include one or more edges based on a predetermined threshold, and sample blocks determined to include texture content are removed. The operations include determining one or more average color variances based on the remaining sample blocks that have not been removed, where one or more noise estimations for the image are based on the average color variances.

Various implementations of the system can include clustering one or more of the sample blocks into color bins based on a mean color of each sample block, where each color bin represents a different sub-range of colors out of a total range of possible colors for the pixels of the image. The clustering can include adding each of the sample blocks into an appropriate one of the color bins in response to the one or more sample blocks having a lower variance than the highest variance block in the appropriate color bin. An average color variance associated with each color bin can be determined based on the remaining sample blocks in each color bin, where a noise rating is determined for the color bin based on the average color variance for the bin. Examining for texture content can include determining whether a magnitude of one dominant direction of one or more edges in each sample block is larger than a magnitude of another dominant direction of one or more edges in that sample block relative to the predetermined threshold. The method can remove sample blocks having a color variance over a predetermined variance threshold, and remove sample blocks which are spatially overlapping at least one other sample block by at least a threshold amount within the image.

DETAILED DESCRIPTION

One or more implementations described herein relate to estimating noise in images. In some implementations, a system can extract sample blocks of pixels from a received image and can examine the blocks for texture content based on whether the sample blocks have one or more edges. Such texture content can indicate a non-uniform color distribution in the block which can erroneously influence the estimation and reduction of noise for the image, and therefore such texture sample blocks can be removed from consideration. In some implementations, sample blocks can be assigned to color bins based on their mean color, and a data structure provided for each color bin allows sample blocks having the lowest color variance to be efficiently stored, sorted, and used to provide noise estimation for the image. These and other described features can allow noise in an image to be efficiently and reliably determined without causing inaccurate noise estimations that can, for example, lead to erroneous de-noising of the image.

In example implementations, the system can extract multiple sample blocks of pixels from a received image, where each sample block includes a subset of pixels of the image. In some implementations, the system clusters the sample blocks into color bins based on a mean color of each sample block, where each color bin represents a different sub-range of colors out of a total range of colors for the pixels of the image. For example, for each sample block, the system can add the sample block to an associated color bin if the sample block has a lower color variance than the highest color variance block in that color bin, and can discard the sample block if the sample block has a higher variance than the highest variance sample block. Added sample blocks can be stored in a data structure associated with the color bin, such as a heap that sorts the sample blocks within the bin based on variance.

The system can remove sample blocks that are less suitable for estimating image noise. For example, sample blocks can be removed which have texture content providing a high variance and which can cause an inaccurate estimate of noise in the image. In some implementations, to determine whether sample blocks have texture content, the system can check whether the blocks have one or more edges based on a predetermined threshold. For example, in some implementations the system can determine image gradients in an examined block, form a matrix from the gradients, and use eigenvalues of the matrix to determine whether one or more edges (and therefore textured content) is present in the examined block. Blocks having texture content are removed from consideration. The system can also remove sample blocks having a color variance over a predetermined variance threshold, where the predetermined variance threshold can be based on the minimum variance of the sample blocks. The system can also remove sample blocks which are spatially overlapping at least one other sample block by at least a threshold amount within the image.

The system can determine an average color variance based on the remaining sample blocks that have not been removed. A noise estimation for the image is based on the average color variances. For example, the system can determine an average color variance and noise estimation for the color range of each color bin based on the remaining sample blocks within each bin.

Such features can allow effective automated detection and estimation of noise existing in images. For example, the system can detect and remove sample blocks of pixels which have texture content based on detection of color edges in those blocks. This removes consideration of texture blocks that can erroneously increase the estimation of noise, thus increasing the accuracy of the noise estimation for the image. Furthermore, clustering sample blocks into color bins representing different color ranges is efficiently and effectively performed, such that low-variance blocks are sorted and high-variance blocks are discarded in the process of clustering. Since noise is automatically estimated using described features, a de-noiser can receive the noise estimations and automatically reduce the noise in the image based on the noise estimations. The user can thus avoid tedious manual examination and noise reduction of each image.

Figure 1:
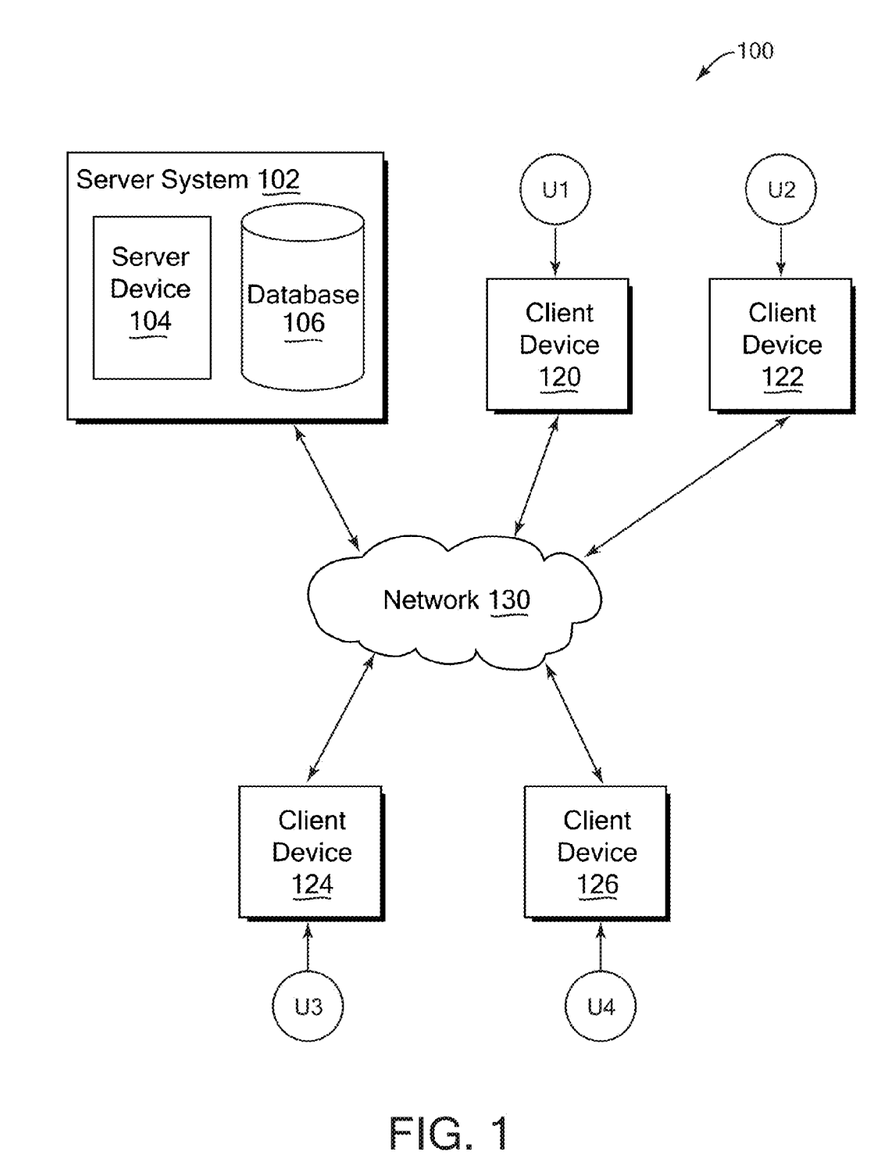
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, TV set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via a social network service implemented on server system 102, where respective client devices 120, 122, 124, and 126 transmit communications and data to one or more server systems such as system 102, and the server system 102 provides appropriate data to the client devices such that each client device can receive shared content uploaded to the social network service via the server system 102. In some examples, the social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, participate in live video, audio, and/or text chat with other users of the service, etc. As used herein, the term "social networking service" can include a software and/or hardware system that facilitates user interactions, and can include a service implemented on a network system. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations can use any type of system and service. For example, any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
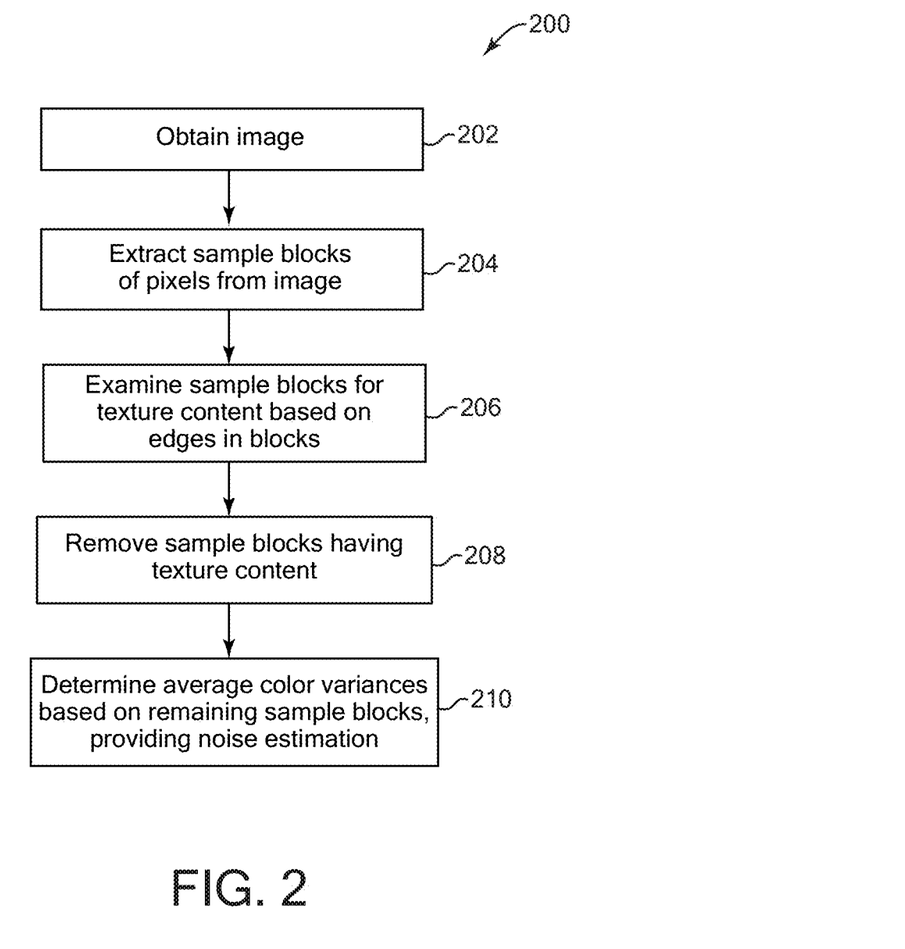
FIG. 2 is a flow diagram illustrating an example method for estimating noise in images, according to some implementations.

FIG. 2 is a flow diagram illustrating one example of a method 200 for estimating noise in images. In some implementations, method 200 can be implemented, for example, on a server system 102 as shown in FIG. 1. In other implementations, some or all of the method 200 can be implemented on a system such as one or more client devices, and/or on both a server system and a client system. In described examples, the system includes one or more processors or processing circuitry, and one or more storage devices such as a database 106 or other storage. In some implementations, different components of one or more servers and/or clients can perform different blocks or other parts of the method 200. Method 200 can be implemented by program instructions or code, which can be implemented by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 200 can be performed as part of or component of an application running on the system, or as an application or software running in conjunction with other applications and operating system.

In some implementations, the method 200 can be initiated automatically by a system. For example, the method can be periodically performed, or performed based on a particular event such as one or more original images being newly uploaded to or accessible by the system, or a condition specified in custom preferences of one or more users of the system. In one non-limiting example, a camera, cell phone, or other portable client device can capture an image and can perform the method 200. In addition or alternatively, the device can send the captured image to a server over a network, and the server can process the image using method 200. Some implementations can initiate method 200 based on user input. A user may, for example, have selected the initiation of the method 200 from an interface such as a social networking interface, application interface, or other interface.

In operation 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. In various implementations, the image can be automatically selected by the method, e.g., as an image from an album or other collection of multiple images, such as an album provided in an account of a user of a social networking system. In some implementations, the system can determine which image to obtain based on evaluating one or more characteristics of accessible images, such as the color distributions of images, timestamps and other metadata of images, and/or identified and recognized content depicted in the images, such as persons, faces, or objects. Alternatively, a user can provide or designate one or more images to process.

In operation 204, the method extracts sample blocks of pixels from the obtained image. The sample blocks are subsets of pixels of the entire image, and can be in a predetermined configuration. For example, square blocks of pixels can be extracted having predetermined pixel dimensions. In some implementations, a number of sample blocks are extracted for each pixel in the image. For example, the method can extract blocks of pixels surrounding a particular pixel, e.g., four blocks at the corners of the particular pixel, and then extracting blocks of pixels surrounding the next adjacent pixel, and so on. In some implementations, blocks surrounding a particular subset of image pixels can be extracted, such as blocks for every $8^{th}$ pixel horizontally and vertically in the image.

Some implementations can extract multiple sets of pixel blocks for each pixel in the image (or for a subset of pixels in the image), where each set includes blocks of a different size, e.g., a different number of pixels. In some implementations, the different block sizes can be multiples of each other. For example, a set of square blocks having dimensions of 8×8 pixels can be extracted around a particular pixel, and in addition a set having 16×16 pixels, a set having 32×32 pixels, and a set having 64×64 pixels can be extracted around that pixel. Such differently-sized blocks can be treated as independent blocks despite having any overlap in image pixels. In some implementations, larger blocks may be preferred as being more reliable for estimating noise.

In operation 206, the method examines the sample blocks for texture content based on one or more edges in the sample blocks. "Texture content," as the term is used herein, refers to textural features within an image and block, such as patterns that provide an appearance of a particular type of surface in a photograph (e.g., rough, corrugated, streaked, dappled, etc.). Texture content typically include pixels having larger, rapid color changes or color discontinuities in order to provide the desired texture appearance, thus providing edges of higher color contrast. Such texture content can realistically and accurately depict subjects within an image and/or can provide a desired effect in the image.

However, such texture content can be confused with noise in the image. Color noise (e.g., chromatic noise) is unintended or undesired color variation or changes in pixels of an image and can be caused by, for example, lighting conditions under which images are captured by a camera (e.g., underexposed photographs), performance of camera components (e.g., image sensors, etc.), image processing software or image conversions, or various other causes. Color noise generally causes small variations in color values of pixels, such that a sample block having noise will generally have an approximately uniform color content. Such noise is desired to be detected and estimated in the sample blocks by method 200 without including texture content from the blocks in the estimation. Lower-variance noise can often be distinguished from color edges and high-contrast color variations caused by textures. However, if most or all areas of an image include texture content, then most or all of the sample blocks may erroneously appear as if they include a high amount of noise since there will be few or no blocks having lower color variations which with to compare, e.g., it becomes more difficult to determine whether the high variation is from noise or from texture content. Checking for and finding texture content in sample blocks as in method 200 allows such texture content to be discounted and excluded as noise, allowing more accurate estimation of actual noise in the image.

Operation 206 therefore examines the sample blocks from the image for texture content based on edges in the blocks. Edges found in the blocks can indicate whether texture content is present in the blocks, since such edges can indicate repeated features in particular directions as provided in textures. Some example techniques for determining whether texture content is present are described below with respect to FIGS. 3 and 5.

In operation 208, the method removes from consideration any sample blocks that were found to have texture content in block 206. As explained above, these blocks can falsely be detected as noise and, for example, can affect a noise reduction process that uses the noise estimates provided by method 200, and are therefore not included in noise estimation. For example, if texture content were to be included in many of the sample blocks used to estimate noise, the resulting noise estimate would include the variances of the high-variance texture content. This can cause an erroneous large amount of noise to be indicated for the image and cause the de-noiser to erroneously overcompensate in the reduction of noise, potentially causing undesired effects in the image.

In operation 210, the method determines one or more average color variances based on the remaining sample blocks that have not been removed in block 208 (and/or have not been removed for other reasons, examples of which are described below). The average color variance is the average of the individual color variances of the remaining sample blocks. In some implementations, an average color variance can be determined in each of multiple color ranges using color bins to group, sort, and store sample blocks, as described in greater detail below with respect to implementations of FIG. 3. The average color variance indicates the noise in the image and thus provides a resulting noise estimation. In some implementations, a de-noiser or other noise-reduction process or module can receive the noise estimation and use the estimation to determine and apply noise reduction processing to the image to remove noise.

Figure 3:
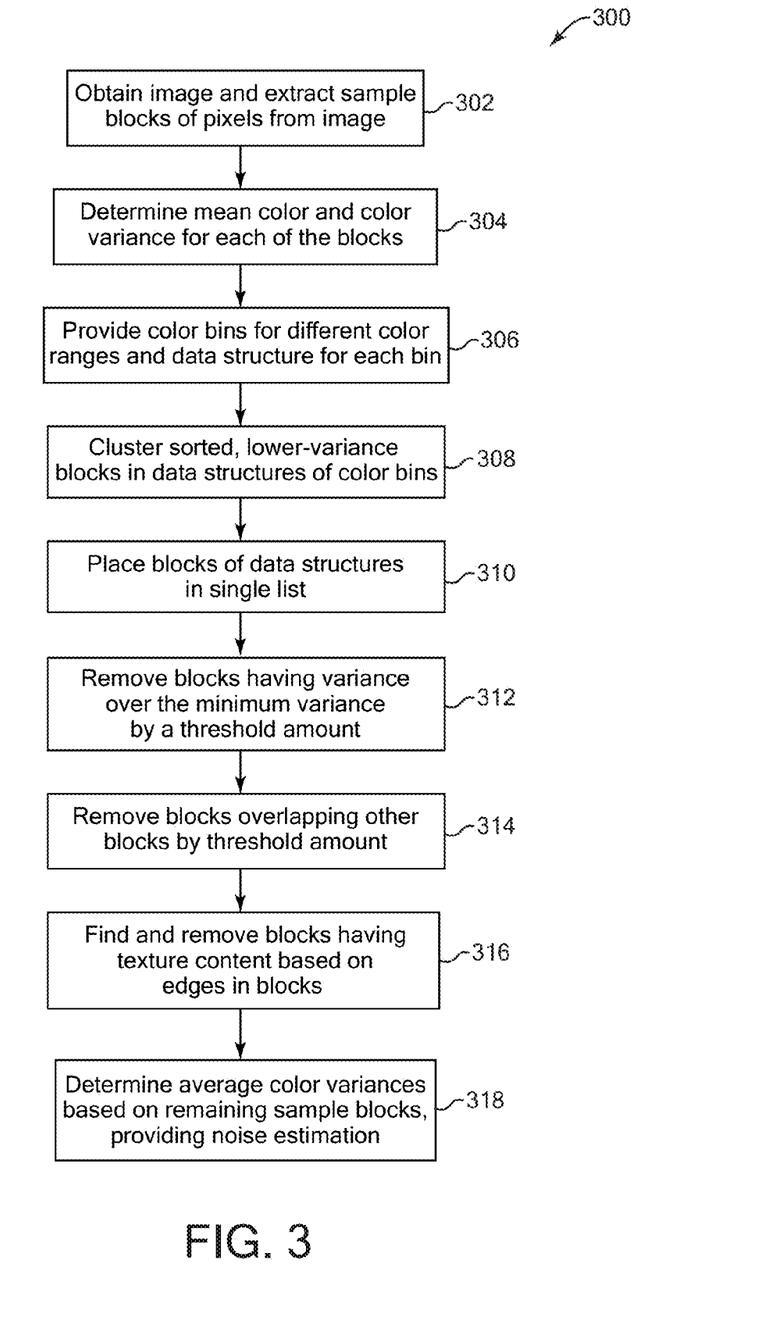
FIG. 3 is a flow diagram illustrating another example method for estimating noise in images, according to some implementations.

FIG. 3 is a flow diagram illustrating another example method 300 for estimating noise in images, according to some implementations. Method 300 can be implemented by a system such as a server and/or client device as described above for method 200.

In operation 302, the method obtains an image and extracts sample blocks of pixels from the image, e.g., similarly as described above for FIG. 2. In an example implementation, the sample blocks of pixels can include multiple different sizes from small to large, such blocks of 8×8 pixels, 16×16 pixels, 32×32 pixels, and 64×64 pixels in one example.

In operation 304, the method determines a mean color and a color variance for each of the blocks. In some examples, the mean color and variance can be determined independently for each color channel, such as for red, green and blue color channels in an RGB color model. The mean color is an average of all the color pixel values in the block, and the variance is the statistical variance indicating how spread out are the color values of the block. When applied to the values of a color channel, the variance can be an estimation of the noise component in that color channel. In some implementations, the variance can be multiplied or divided by a constant that depends on the block size, to compensate for different sizes of the blocks and equalize the variances so that they are comparable. In some examples, the largest size block (e.g., 64×64) can be unmodified, and smaller blocks can be multiplied by a factor, where the smaller the block size, the larger the factor. For example, if the largest blocks are of size 64×64, the variance of an 8×8 block can be multiplied by a factor of 8. In other implementations, a different scale factor can be used, e.g., a factor determined based on manual tuning.

In operation 306, the method provides color bins for different color ranges and provides a data structure for each color bin. For example, the entire color range used for the image can be divided into equal sub-ranges based on the number of color bins, where each color bin is assigned to one of the sub-ranges. Each color bin thus represents a different sub-range of colors out of the total range of possible colors for the pixels in the image. In some example implementations, the total number of bins can be K×K×K, where K is a small number (e.g., 6 or similar number). This number of bins can quantize K color ranges for each of the three color channels into the total number of bins.

The data structures for the bins can be used to store and sort sample blocks within the bins according to variance and can allow fast and efficient comparisons of variance for a sample block in the eligible color range for a bin. In some implementations, each data structure can be a heap that sorts sample blocks within a bin. For example, min-heaps can be used, or other types of heaps. In other implementations, other types of data structures can be used.

In operation 308, the method clusters sorted, lower-variance blocks into the data structures of the color bins. For example, each color bin can store a predetermined maximum number of sample blocks, and at the end of the clustering process the stored sample blocks can be the blocks having the minimum variance of all the sample blocks in the color range for that bin. The sample blocks can each be assigned to an associated color bins based on its mean color, and can be stored and sorted in the associated bin according to its variance. One example implementation of efficiently clustering sample blocks into bins using the data structures is described below with reference to FIG. 4.

In operation 310, the method can optionally place the sample blocks of the data structures into a single list. For example, the sample blocks in the data structures of the bins can all be collapsed into the single list to allow easier processing by the next operations of method 300. In operation 312, the method removes blocks having a variance over the minimum variance of the blocks by a threshold amount. In some implementations, the method can traverse the list of all blocks created in operation 310 and can find the minimum variance of the blocks in the list. Then the variances of the blocks in the list can be checked against the minimum variance, and blocks having a variance over that minimum variance by at least a predetermined threshold amount are removed from the list and discarded. This allows extreme variances to be removed from the sample blocks used to estimate noise, creating a more uniform distribution of variances across all color ranges.

In operation 314 the method removes sample blocks that are spatially overlapping one or more other blocks within the image space by at least a threshold amount. For example, the overlap check can be performed by checking the image coordinates of the sample blocks. This removal can be performed to discard at least partially redundant blocks that include all or many of the same pixels as other blocks, thus retaining blocks for different areas of the image, and also can serve to retain blocks that are more separated in their color. In some implementations, the threshold amount can be a 25% overlap, for example. Some implementations can retain the largest available block size between the overlapping blocks. For example, if a small block overlaps with a larger block, the larger block can be retained and the smaller block removed.

In operation 316, the method finds and removes blocks having texture content determined based on edges in the blocks. As described above with respect to FIG. 2, sample blocks having texture content are not desired to be retained for estimating noise since texture content has a high variance and can skew the noise estimation too high. Thus, blocks found to have texture content are removed from consideration in operation 316. Some examples of checking for texture content in blocks are described below with reference to FIG. 6.

In operation 318, the method determines average color variances based on the remaining sample blocks that have not been removed, where the determined variances provide the noise estimation for the image. The color bins associated with each the remaining sample blocks are known and so the average color variance can be determined for each color range represented by a color bin by averaging the remaining sample blocks in each bin. This provides a resulting variance for each color range, e.g., a noise profile for the entire color range. In various implementations, color bins that have no remaining blocks can indicate that the associated color range has no noise in the image, or can indicate that the color range did not have any suitable blocks to estimate for noise.

Providing a variance profile or noise profile can be useful in many contexts because noise in an image can vary based on the particular color of the image area in which it is found. For example, many de-noisers and other noise reduction processes may vary noise reduction processes based on the particular color range in which estimated noise falls. Some types of de-noising techniques operate by grouping pixels that are similar in color and averaging them to obtain an estimate for the pixels. The averaging removes the high frequency components (or fluctuations) that are attributed to noise. For example, the decision as to which pixels are similar can be based on checking the difference between colors of different pixels. If the difference in colors is lower than a threshold, then these pixels will be classified as similar and will be averaged together. The noise variances estimated by the noise estimation methods described herein can be used to determine the thresholds used by the de-noiser. In some implementations, the noise estimator provides the noise variance expected at the color range associated with each color bin. The de-noiser can, in some implementations, modify the noise variance (e.g., multiply it by a predetermined fraction) and use the modified noise variance as the threshold. These thresholds can be used to group pixels which have color differences lower than the threshold and average them to obtain its output having reduced noise.

Various operations of method 300 can be performed in a different order than shown and/or at least partially simultaneously. For example, some implementations can perform operation 314 at least partially simultaneously with operation 312 and combining the results from each operation to determine the remaining sample blocks.

Figure 4:
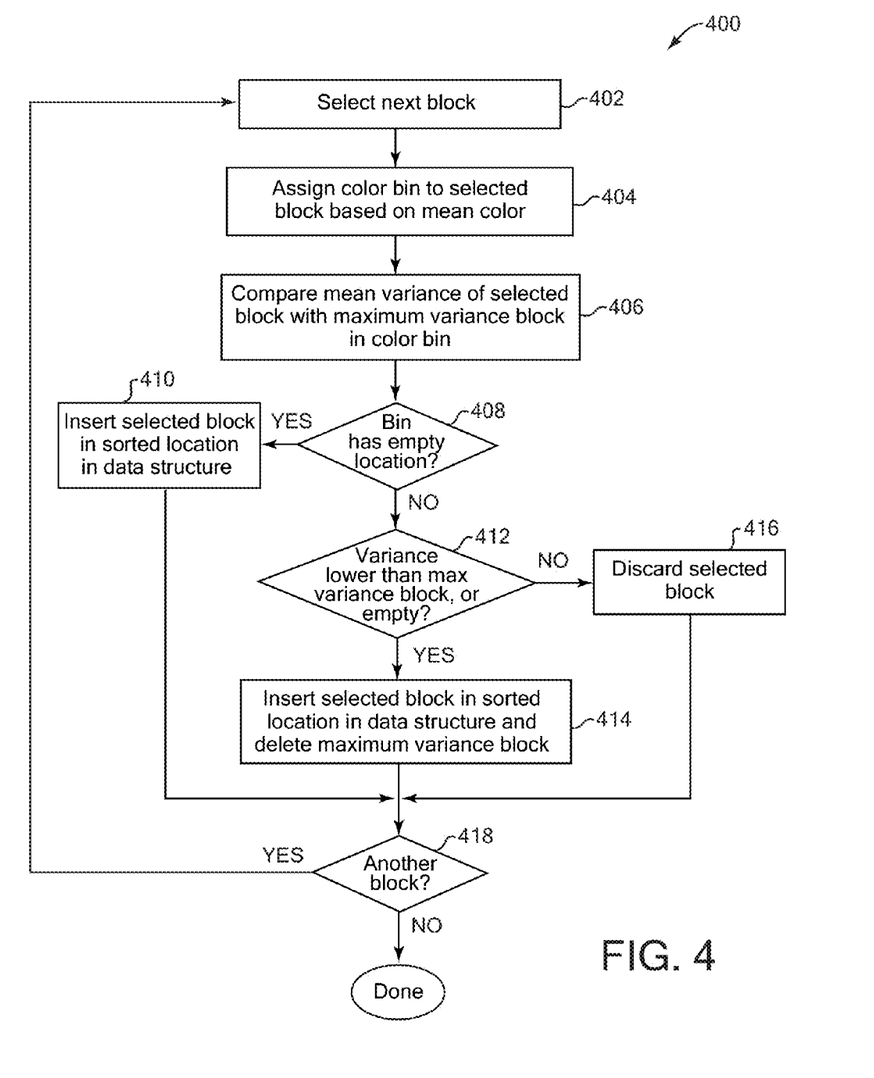
FIG. 4 is a flow diagram illustrating a method for clustering sample blocks in color bins, according to some implementations.

FIG. 4 is a flow diagram illustrating an example method 400 for clustering sample blocks in color bins, which can be used in the methods described above such as in operation 308 of method 300 of FIG. 3, for example. Method 400 can access sample blocks which have been extracted from the image and have had mean colors and color variances determined as described for method 300 of FIG. 3.

In operation 402, the method selects the next block for processing. In operation 404, the method assigns an appropriate color bin to the selected block based on the mean color of the block. For example, a number of color bins (such as K×K×K) were created in previous operation 306 and the mean color can be converted or quantized to a bin number within the range of bins. A goal can be to distribute blocks in different bins across all color ranges, e.g., to allow noise to be estimated in the different ranges based on sample blocks having mean colors in as many different color ranges as possible. In one non-limiting example, assuming K=6 and the number of bins is 216, a block with an RGB mean color of (128, 128, 128) has values halfway in the range of 0 to 255 for all three color channels, and therefore can be assigned to the bin 108, which is the bin number halfway in the range of 216 bins. A block having a mean color of (0, 0, 0) can be assigned to the bin 1, a block having a mean color of (255, 255, 255) can be assigned to the last bin 216, and blocks having other mean colors can be assigned to a bin between these extremes. Other bin-assignment methods can be used in other implementations.

In operation 406, the method compares the mean variance of the selected block with the maximum variance block in the assigned color bin. Any blocks already stored in the data structure of the bin were assigned to the bin in previous iterations. In some implementations, a heap data structure is used for each bin, where new additions to the heap are sorted based on their variance. This allows the selected block to be readily compared with a maximum variance block that has been sorted within the heap.

In operation 408, the method checks whether the assigned color bin has any empty, available locations (e.g., slots or nodes) to store the selected block in its data structure. Each data structure can store a predetermined maximum number of blocks. If there is an empty location for the selected block, e.g., the bin currently stores less than its maximum blocks, then in operation 410 the method inserts the selected block in a sorted location in the data structure. For example, if a heap is used as the data structure, the selected block is inserted in the heap in a sorted location based on its variance. For example, the selected block can be compared to blocks in the heap, starting with the maximum variance block (e.g., in a min-heap) and traversing the blocks of reducing variance (if necessary) until a block with a lower variance than the selected block is found, and the selected block is inserted ahead of that block in the heap. The method then continues to operation 418, described below.

If in operation 408 the color bin does not have an empty location, then in operation 412 the method checks whether the variance of the selected block is lower than the maximum variance in the color bin. If so, then in operation 414 the selected block is inserted in a sorted location of the data structure in the color bin. For example, if a heap is used, the selected block is compared to blocks in the heap in a direction of reducing variance until a block with a lower variance than the selected block is found, and the selected block is inserted ahead of that block in the heap. The maximum variance block is deleted to make room in the data structure for the selected block. The method then continues to operation 418, described below.

If in operation 412 the variance of the selected block is found to be higher than the maximum variance in the color bin, then in operation 416 the method discards the selected block and continues to operation 418. The selected block is thus found to have had too high a variance to be stored in the color bin as compared to blocks already stored in the bin. The use of the data structure in the bin allows the method to make a single comparison to the maximum variance block, which often results in the selected block being discarded and thus saves processing resources. In contrast, in some previous noise estimators, all sample blocks were sorted into color bins and all the blocks were compared with each other to find the blocks with minimum variances, requiring considerably more processing.

In operation 418 the method checks if there is another block to examine for insertion into a color bin. If so, the process returns to operation 402 to select the next block. If not, the process ends. An example of storing sample blocks in color bins according to method 400 is described below with reference to FIG. 5.

Various operations of method 400 can be performed in a different order than shown and/or at least partially simultaneously. For example, in some implementations, the method can assign all the sample blocks to color bins in block 404, then perform operations 408-416 to insert them in the data structures or discard them.

Figure 5A:
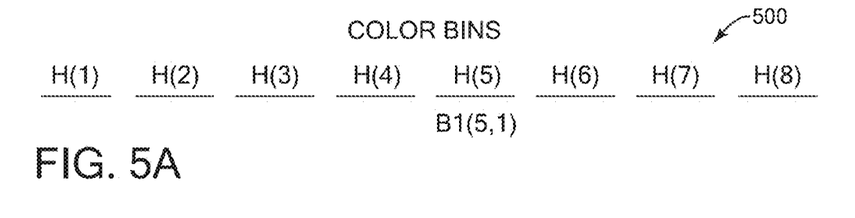
FIGS. 5A-5D are diagrammatic illustrations of a simplified example of storing blocks in heap data structures of color bins.

FIGS. 5A-5D are diagrammatic illustrations of a simplified example of storing blocks in heap data structures of color bins as described above in the method 400 of FIG. 4. In FIG. 5A, color bins 500 are provided for grouping and storing sample blocks as described above. The color bins 500 can each include a data structure such as a heap H as described above. In this example, K=2 so there are eight color bins, and each color bin includes a heap H, labelled H(1) through H(8). Each heap can hold a maximum of two blocks. In this example, each color bin stores blocks having the same mean color as the number of the heap/bin. Blocks are denoted as B(mean color, variance). Thus, in FIG. 5A a selected block B1(5,1) is assigned to the bin having heap H(5) based on its mean color 5. The block B1 is inserted as the first block in the heap H(5) since the heap is empty.

Figure 5B:
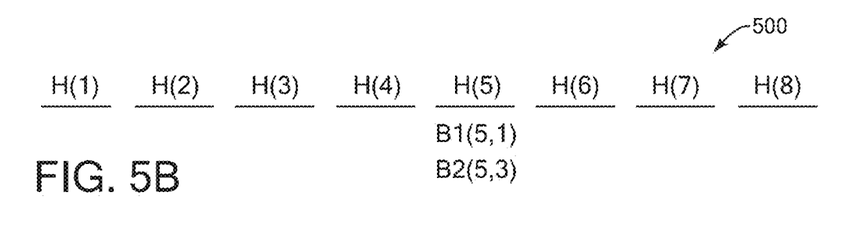
Figure 5C:
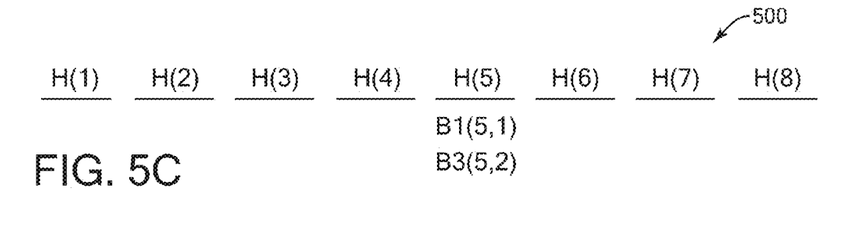

In FIG. 5B, another block B2(5,3) is assigned to the same bin having heap H(5). Since the heap H(5) still has room to store the block, block B2 is inserted in the heap in a sorted manner, e.g., after the block B1 which has a lower variance. In FIG. 5C, the block B3(5,2) is assigned to the same bin having heap H(5). In this case, the heap is full, so the variance of block B3 is compared to the maximum variance in the heap H(5), which is a variance of 3 from block B2. The variance of block B3 is 2, which is less than the maximum variance, and so block B3 is inserted in the heap H(5) in sorted order and the maximum variance block B2 is removed and discarded. Finally, in FIG. 5D the block B4(8,1) is assigned to the bin having heap H(8) based on its mean color of 8. This color bin is empty and thus block B4 is added to the heap H(8).

Figure 5D:
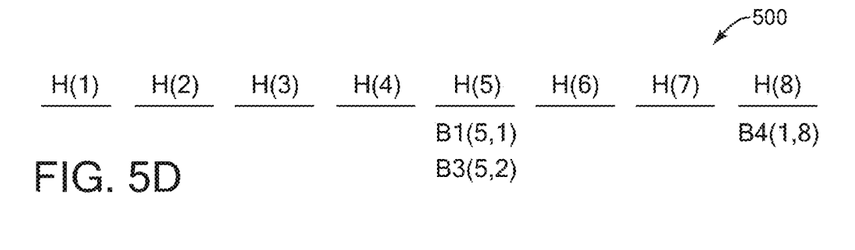

Additional blocks can be added to the color bins in a similar fashion. After all blocks have been processed, a maximum of two blocks are stored for each color range represented by the bins, where the stored blocks are the two lowest variance blocks for that color range out of all of the sampled blocks. The noise variance can be estimated using the mean of all variances in each heap.

Figure 6:
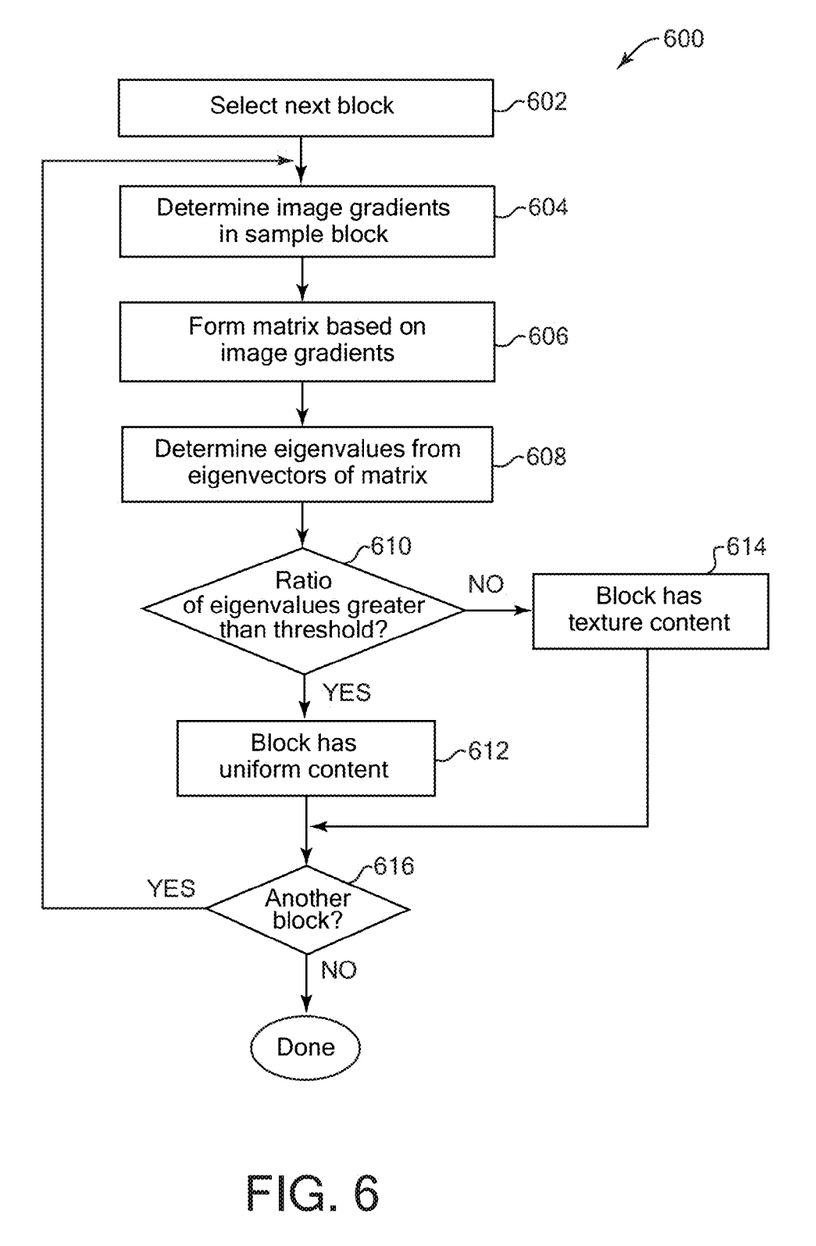
FIG. 6 is a flow diagram illustrating an example method for finding blocks having texture content, according to some implementations.

FIG. 6 is a flow diagram illustrating an example method 600 for finding and removing blocks having texture content, which can be used in the methods described above. For example, method 200 can be used in operation 204 of method 200 of FIG. 2, or in operation 316 of method 300 of FIG. 3. Method 600 can receive a number of remaining sample blocks which have been extracted from the image and, in some implementations, may have been reduced in number from original extracted number of blocks based on previous operations as in the example method 300 of FIG. 3.

In operation 602, the method selects the next block for processing. In operation 604, the method determines image gradients in the selected sample block. For example, the image gradients can be performed using filters on the pixels of the block. In some non-limiting examples, a simple horizontal filter can be used (e.g., with a kernel of (1, −1)) to find the difference in color between a current pixel and the adjacent pixel in a particular horizontal direction. This can be performed for all the pixels in the horizontal direction to obtain a horizontal gradient, and repeated for each horizontal pixel row of the block. A simple vertical filter can be similarly used to find the difference in color between the current pixel and the adjacent pixel in a particular vertical direction. The vertical filter can be used for all the pixels in the vertical direction to obtain a vertical gradient, and repeated for each vertical pixel column of the block. Other filters and/or gradients can be used in other implementations.

In operation 606, the method forms a matrix based on the image gradients. In some implementations, for example, the matrix can be a structure matrix G formed according to the following:

$$g=[g_x, g_y]^T \quad (1)$$

$$K=[g_1, g_2, \ldots, g_M] \quad (2)$$

$$G=KK^T \quad (3)$$

Where $g_i$ is the image gradient at the $i^{th}$ pixel of the block, and T indicates the transpose of the matrix. Hence, G is a 2×2 matrix.

In operation 608, the method determines eigenvalues based on the matrix. The eigenvectors of the matrix represent the dominant directions in the block. The eigenvalues s1 and s2 represent the relative strength of the eigenvectors. In some example implementations, 2×2 singular value decomposition (SVD) can be used on the 2×2 matrix G described above to analytically obtain singular vectors and singular values, and from these the eigenvalues can be determined, e.g., where the eigenvalues are typically the same as the singular values in this example.

In operation 610, the method checks whether the ratio of the eigenvalues is greater than a predetermined threshold. This ratio can be used as an indicator as to whether the block includes texture content or approximately uniform content. For example, if the ratio s1/s2 of the eigenvalues is close to a predetermined value, such as 1, within the amount of the predetermined threshold, then the implication is that the dominant directions within the block are approximately equal. Thus, the content in the block is approximately uniform in color, where the pixels have a color close to each other, and is not considered to be texture content. Therefore noise is more readily detected, since the variance of the sample block is more likely to be based on noise in the block. For example, if a uniform color block having the same pixel color values has noise added, there can be small variations in values resulting, and that variation is estimated as noise. Thus, the method continues to operation 612 to decide that the block has approximately uniform color content, and proceeds to operation 616, described below.

If the ratio of the eigenvalues is sufficiently different than 1, e.g., greater than 1 by the predetermined threshold or more, then one of the dominant directions of edges within the block has a much greater magnitude than the perpendicular dominant direction of edges, and the implication is that one or more edges are present in the block as included in texture content. Therefore, the method continues to operation 614 to decide that the block has texture content, and then proceeds to operation 616.

Thus the method determines whether a magnitude of one dominant edge direction in the sample block is larger than a magnitude of the other dominant edge direction in the sample block relative to a predetermined threshold, e.g., when the ratio of the magnitudes is taken. In other implementations, a different comparison of eigenvalues with each other can be performed to indicate whether the texture content is present in the examined sample block.

In some implementations, the use of a matrix and eigenvalues as described above to find dominant directions and texture content performs better if the sample block is smaller. In such cases, a larger block can be broken down into smaller blocks and the above check for texture content can be applied to each of the component smaller blocks.

In operation 616, the method checks whether there is another block to process. If so, the method returns to operation 602 to select another block for processing. If not, the method ends. Before estimating noise based on the blocks, the blocks determined to have texture content are removed from consideration since the higher color variation in these blocks (e.g., from edges) is more likely due to texture content which is not distinguishable from noise. The blocks having uniform color values are used to estimate noise, e.g. the variances of these blocks are most likely due to noise.

Other implementations can check for and detect texture content in blocks in other ways based on dominant edges in the blocks, instead of (or in addition to) using eigenvalues derived from processing the blocks as described above. For example, directional difference filters (horizontal, vertical, diagonal, etc.) can be applied to a sample block the responses to these filters can be checked to determine if the responses are similar. If the responses are similar, then the probability of a dominant edge existing in the block is small. If one of the filters has a large response and the other filter(s) do not, then the probability of a dominant edge existing in the block is higher. In some implementations, one or more thresholds and/or ratios of responses similarly as described above can be checked such that texture content can be considered present in the block if the thresholds are met.

The finding and removing of sample blocks that include texture content allows methods described herein to be more robust in estimating noise. For example, previous noise estimators may fail at noise estimation when there are no uniformly-colored squares in the image, since such estimators always estimate noise regardless of the presence of texture content. Such noise estimators erroneously estimate a high level of noise based on the high variances of texture content in sample blocks.

It should be noted that the operations described in the methods of FIGS. 2-4 and 6 can be performed in a different order than shown and/or simultaneously (partially or completely) with other operations, where appropriate. In some implementations, operations can occur multiple times, in a different order, and/or at different times in the methods. In some implementations, the methods 200, 300, 400 and/or 600 can be implemented, for example, on a server system 102 as shown in FIG. 1. In some implementations, one or more client devices can perform one or more blocks instead of or in addition to a server system performing those blocks.

Figure 7:
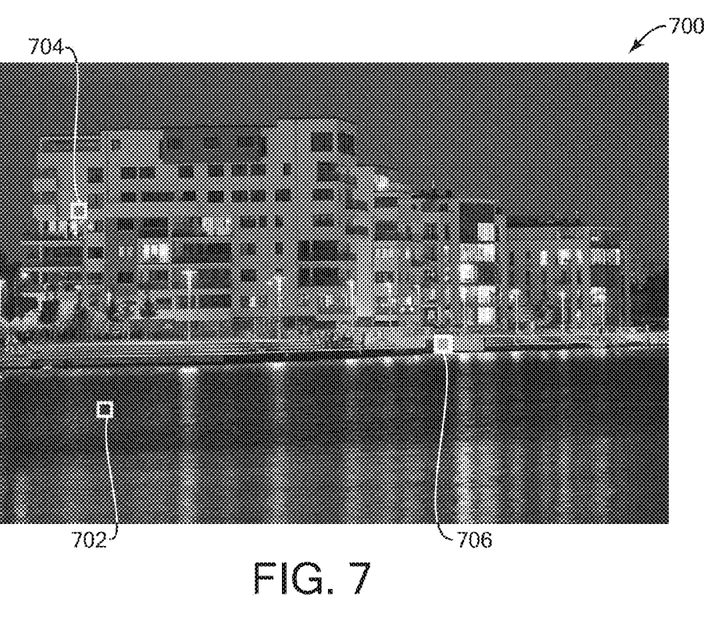
FIG. 7 is a diagrammatic illustration of an example image that can be processed using one or more features described herein to detect noise in the image.

FIG. 7 is a diagrammatic illustration of an example image 700 that can be processed using one or more features described herein to detect noise in the image. In various implementations, image 700 can be displayed on a display device, e.g., of a client device 120, 122, 124, and/or 126 of FIG. 1, or a server system 102 in some implementations. In other implementations, the image 700 can be processed as described herein without being displayed, or being displayed after all processing (e.g., including noise reduction) is complete. In one non-limiting example, a user can view image 700 displayed in an interface on a client device. Image 700 includes a degree of color noise as indicated by the change in color of pixels in particular areas (color noise is approximated in the figure which is shown in grayscale).

The methods described above can extract sample blocks of pixels from the image 700. For example, sample blocks can be extracted around each pixel or a subset of pixels in the image 700, having one or more different sizes (pixel dimensions). In this simplified example, a sample block is taken from area 702, one from area 704, and one from area 706 of the image 700. Other sample blocks extracted are not shown.

Figure 8:
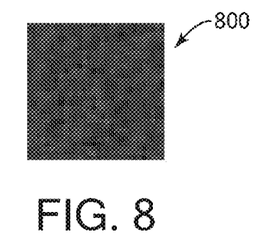
FIGS. 8-10 are diagrammatic illustrations of examples of sample blocks of pixels which can be extracted from an image.
Figure 9:
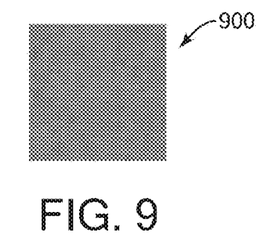
Figure 10:
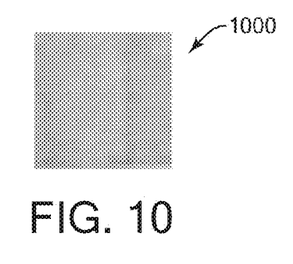

FIGS. 8-10 are diagrammatic illustrations of examples of sample blocks of pixels which can be extracted from an image such as image 700 of FIG. 7. Sample block 800 of FIG. 8 can correspond to area 702 of FIG. 7, for example, and shows color noise in the pixel color differences (approximated in gray shades in the figure). A noise estimation method using features described above has found sample block 800 to be an approximately uniform block that is suitable for noise estimation, having no dominant edge direction to indicate texture content. Sample block 900 of FIG. 9 can correspond to area 704 of image 700, for example, and also shows color noise. Block 900 was similarly found by the noise estimator to be an approximately uniform block and to not include texture content for purposes of noise estimation. Sample block 1000 of FIG. 10 can correspond to area 706 of image 700, for example. Block 1000 was found by the noise estimator to include texture content due to having a dominant gradient direction, e.g., caused by one or more edges in the block. Block 1000 is therefore removed from consideration when estimating the noise in image 700 as described above in various implementations.

Figure 11:
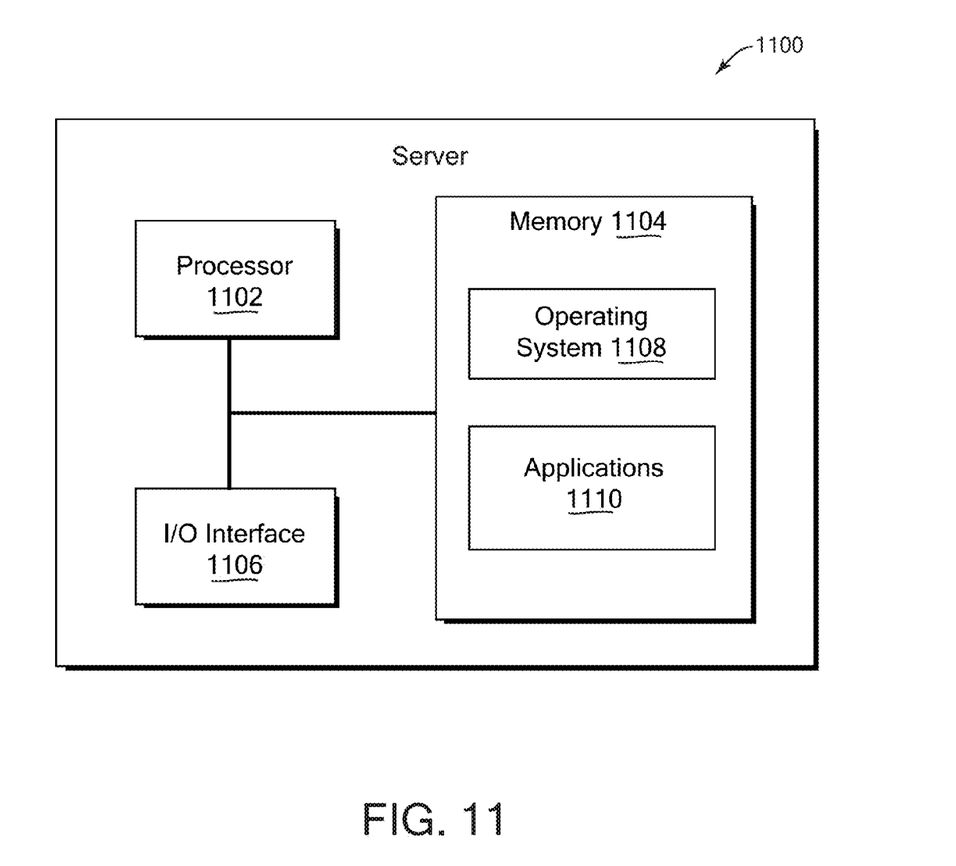
FIG. 11 is a block diagram of an example device which may be used for one or more implementations described herein.

FIG. 11 is a block diagram of an example device 1100 which may be used to implement some implementations described herein. In one example, device 1100 may be used to implement server device 104 of FIG. 1, and perform appropriate method implementations described herein. Server device 1100 can be any suitable computer system, server, or other electronic or hardware device. For example, the server device 1100 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 1100 includes a processor 1102, a memory 1104, and input/output (I/O) interface 1106.

Processor 1102 can be one or more processors or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108 and one or more applications engines 1110 such as a graphics editing engine, web hosting engine, social networking engine, etc. In some implementations, the applications engines 1110 can include instructions that enable processor 1102 to perform the functions described herein, e.g., some or all of the methods of FIGS. 2, 3, 4 and/or 6. Any of software in memory 1104 can alternatively be stored on any other suitable storage location or computer-readable medium. In addition, memory 1104 (and/or other connected storage device(s)) can store images, sample blocks, color bins, data structures, and other data used in the features described herein. Memory 1104 and any other type of storage (magnetic disk, optical disk, magnetic tape, or other tangible media) can be considered "storage devices."

I/O interface 1106 can provide functions to enable interfacing the server device 1100 with other systems and devices. For example, network communication devices, storage devices such as memory and/or database 106, and input/output devices can communicate via interface 1106. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 11 shows one block for each of processor 1102, memory 1104, I/O interface 1106, and software blocks 1108 and 1110. These blocks may represent one or more processors or processing circuitries, operating systems, memories, I/O interfaces, applications, and/or software modules. In other implementations, server device 1100 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 1100, such as processor(s) 1102, memory 1104, and I/O interface 1106. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
   extracting a plurality of sample blocks of pixels from a received image, wherein each sample block includes a subset of pixels of the image;
   examining one or more of the sample blocks for texture content based on whether the one or more sample blocks include one or more edges based on a predetermined threshold;
   clustering one or more of the sample blocks into associated color bins based on a mean color of each sample block, wherein each color bin represents a different sub-range of colors out of a total range of colors for the pixels of the image;
   removing at least one of the sample blocks, the removed at least one sample block determined to include texture content; and
   determining one or more average color variances based on the remaining sample blocks that have not been removed, wherein one or more noise estimations for the image are based on the one or more average color variances, wherein the determining one or more average color variances includes determining an average color variance associated with each color bin based on the remaining sample blocks in each color bin, wherein a noise estimation for each color bin is based on the associated average color variance for each color bin.

2. The method of claim 1 wherein clustering one or more the sample blocks into color bins includes adding each of the one or more sample blocks into an associated color bin in response to the sample block having a lower variance than the highest variance block in the associated color bin.

3. The method of claim 2 wherein each color bin provides a data structure for storing a sorted order of the one or more sample blocks in the color bin based on a variance of the one or more sample blocks in the color bin.

4. The method of claim 3 wherein the data structure is a heap.

5. The method of claim 3 wherein clustering the one or more sample blocks into bins includes, for each sample block:
   adding the sample block to the data structure of the associated color bin in a sorted position within the data structure in response to a variance of the sample block being lower than the highest variance sample block in the data structure of the associated color bin; and
   discarding the sample block in response to the sample block having a higher variance than the highest variance sample block in the data structure of the associated color bin.

6. The method of claim 1 further comprising removing one or more of the plurality of sample blocks having a color variance over a predetermined variance threshold.

7. The method of claim 6 wherein the removing sample blocks having a color variance over a predetermined variance threshold includes examining the sample blocks to find the minimum variance of the sample blocks, wherein the predetermined variance threshold is based on the minimum variance.

8. The method of claim 1 further comprising removing one or more sample blocks which are spatially overlapping at least one other sample block by at least a threshold amount within the image.

9. The method of claim 1 wherein examining one or more of the sample blocks for texture content includes determining whether a magnitude of one dominant direction of one or more edges in each sample block is larger than a magnitude of another dominant direction of one or more edges in that sample block relative to the predetermined threshold.

10. The method of claim 9 wherein examining one or more of the sample blocks for texture content includes determining one or more image gradients in each of the examined sample blocks and forming a matrix from the image gradients, wherein eigenvalues of the matrix are used to determine whether the predetermined threshold has been exceeded, thereby indicating a presence of texture content.

11. The method of claim 10 wherein a ratio of the eigenvalues is compared to a predetermined value and to the predetermined threshold around the predetermined value to determine whether the texture content is present in the examined sample block.

12. The method of claim 1 wherein the plurality of sample blocks include sample blocks having at least two different sizes and different numbers of pixels.

13. A method comprising:
   receiving an image including a plurality of pixels;
   extracting a plurality of sample blocks of pixels from the image, wherein each sample block includes a subset of pixels of the image;
   clustering the sample blocks into appropriate color bins based on a mean color of each sample block, wherein each color bin represents a different sub-range of colors out of a total range of possible colors for the pixels of the image;
   removing at least one of the one or more sample blocks in response to determining that the at least one sample block includes texture content having one or more edges; and
   determining an average color variance associated with each color bin based on the remaining sample blocks in each color bin that have not been removed, wherein a noise estimation for each color bin is based on the average color variance for the color bin.

14. The method of claim 13 wherein each sample block is added to a data structure of an associated color bin in a sorted position within the data structure in response to a variance of the sample block being lower than the highest variance sample block already in the data structure.

15. The method of claim 13 wherein removing at least one of the one or more sample blocks includes examining one or more of the sample blocks for texture content by:
   determining one or more image gradients in each of the examined sample blocks, and
   forming a matrix from the image gradients for each sample block, wherein each matrix is used to determine whether one or more edges are present in each examined sample block based on a predetermined threshold.

16. A system comprising:
a storage device; and
at least one processor accessing the storage device and operative to perform operations comprising:
  extracting a plurality of sample blocks of pixels from a received image, wherein each sample block includes a subset of pixels of the image;
  examining one or more of the sample blocks for texture content based on whether the one or more sample blocks include one or more edges relative to a predetermined threshold;
  clustering one or more of the sample blocks into color bins based on a mean color of each sample block, wherein each color bin represents a different subrange of colors out of a total range of possible colors for the pixels of the image,
  removing at least one of the sample blocks, the removed at least one sample blocks determined to include texture content; and
  determining one or more average color variances based on the remaining sample blocks that have not been removed, wherein one or more noise estimations for the image are based on the one or more average color variances, wherein the determining one or more average color variances includes determining an average color variance associated with each color bin based on the remaining sample blocks in each color bin, wherein for each color bin, a noise estimation is determined for the color bin based on the average color variance for the color bin.

17. The system of claim 16 wherein clustering one or more the sample blocks into color bins includes adding each of the one or more sample blocks into an appropriate one of the color bins in response to the one or more sample blocks having a lower variance than the highest variance block in the appropriate color bin.

18. The system of claim 16 wherein examining one or more of the sample blocks for texture content includes determining whether a magnitude of one dominant direction of one or more edges in each sample block is larger than a magnitude of another dominant direction of one or more edges in that sample block relative to the predetermined threshold.

19. The system of claim 16 further comprising:
  removing one or more of the sample blocks having a color variance over a predetermined variance threshold; and
  removing one or more of the sample blocks which are spatially overlapping at least one other sample block by at least a threshold amount within the image.

* * * * *